(12) United States Patent
Druml et al.

(10) Patent No.: US 11,536,810 B2
(45) Date of Patent: Dec. 27, 2022

(54) DELAY MEASUREMENT, MONITORING, AND COMPENSATION OF AN OSCILLATOR CONTROL SYSTEM

(71) Applicant: Infineon Technologies AG, Neubiberg (DE)

(72) Inventors: Norbert Druml, Graz (AT); Philipp Greiner, Graz (AT); Hermann Hofer, Raaba-Grambrach (AT); Ievgeniia Maksymova, Graz (AT)

(73) Assignee: Infineon Technologies AG, Neubiberg (DE)

( * ) Notice: Subject to any disclaimer, the term of this patent is extended or adjusted under 35 U.S.C. 154(b) by 437 days.

(21) Appl. No.: 16/855,196

(22) Filed: Apr. 22, 2020

(65) Prior Publication Data

US 2021/0333366 A1 Oct. 28, 2021

(51) Int. Cl.
*G01S 7/481* (2006.01)
*G02B 26/08* (2006.01)
*G01S 7/484* (2006.01)
*G01S 17/10* (2020.01)
*G01S 7/497* (2006.01)
*G02B 26/10* (2006.01)

(52) U.S. Cl.
CPC ............ *G01S 7/4817* (2013.01); *G01S 7/484* (2013.01); *G01S 7/497* (2013.01); *G01S 17/10* (2013.01); *G02B 26/0833* (2013.01); *G02B 26/105* (2013.01)

(58) Field of Classification Search
CPC ............................. G01S 7/4817; G01S 7/484
See application file for complete search history.

(56) References Cited

U.S. PATENT DOCUMENTS

2018/0241477 A1\* 8/2018 Turbide ................. G01S 7/497
2019/0162948 A1\* 5/2019 Laaksonen ............... B81B 7/02

\* cited by examiner

*Primary Examiner* — Jerry T Jean Baptiste
(74) *Attorney, Agent, or Firm* — Harrity & Harrity, LLP (57) ABSTRACT

An oscillator control system that includes an oscillator structure; a phase error detector configured to generate a phase error signal based on a delayed event time signal and delayed reference signal; an analog signal path coupled between the oscillator structure and the phase error detector, the analog signal path configured to receive an event time signal and produce the delayed event time signal; a control circuit configured to generate a reference signal; a programmable delay circuit configured to receive the reference signal and induce a programmable delay on the reference signal thereby generating the delayed reference signal; and an analog delay measurement circuit configured to inject a test signal into the analog signal path, receive a delayed test signal from the analog signal path, measure an analog delay of the delayed test signal, and generate a configuration signal configured to adjust the programmable delay according to the measured analog delay.

22 Claims, 5 Drawing Sheets

DELAY MEASUREMENT, MONITORING, AND COMPENSATION OF AN OSCILLATOR CONTROL SYSTEM

BACKGROUND

Light Detection and Ranging (LIDAR), is a remote sensing method that uses light in the form of a pulsed laser to measure ranges (variable distances) to one or more objects in a field of view. In particular, a microelectromechanical system (MEMS) mirror is used to scan light across the field of view. Arrays of photodetectors receive reflections from objects illuminated by the light, and the time it takes for the reflections to arrive at various sensors in the photodetector array is determined. This is also referred to as measuring time-of-flight (TOF). LIDAR systems form depth measurements and make distance measurements by mapping the distance to objects based on the time-of-flight computations. Thus, the time-of-flight computations can create distance and depth maps, which may be used to generate images.

A LIDAR scanning system includes a scanning mirror and corresponding circuitry for scanning a field of view. The scanning mirror oscillates about one or more scanning axes as it scans the field of view. The ability to accurately sense the position information (e.g., rotation angle) of the scanning mirror about its scanning axis or axes is crucial to accurate laser shooting. More accurate and precise this position information leads to more accurate the laser shooting and light detection at the receiver. However, the accuracy of this position information of typical position sensing circuitry is impaired by a number of analog delays caused by the driving and sensing circuitry at the MEMS mirror and by the analog signal path that extends from the driving and sensing circuitry to the MEMS driver. The analog signal path include various analog components (current clamps, transimpedance amplifiers (TIAs), low-pass filters, etc.) and printed circuit board (PCB) interconnects. Analog delays may also vary with changes in temperature and the age of the system. Thus, analog delays are not static and may change over time. Analog delays may change during a scanning operation of the system. If this analog delay is not compensated properly, the accuracy of the laser shooting is impaired.

Therefore, an analog delay compensation system capable of compensating for analog delays and timing errors in real-time may be desirable.

SUMMARY

One or more embodiments provide an oscillator control system that includes an oscillator structure configured to oscillate about a rotation axis; a phase error detector configured to generate a phase error signal based on a delayed event time signal and delayed reference signal, wherein the delayed event time signal indicates measured event times of the oscillator structure oscillating about the rotation axis and the delayed reference signal indicates expected event times of the oscillator structure oscillating about the rotation axis; an analog signal path coupled between the oscillator structure and the phase error detector, the analog signal path configured to receive an event time signal indicating the measured event times and induces an analog delay on the event time signal thereby generating the delayed event time signal; a control circuit configured to generate a reference signal that indicates the expected event times and generate a driving signal to drive an oscillation of the oscillator structure based on the phase error signal; a programmable delay circuit configured with a programmable delay, the programmable delay circuit configured to receive the reference signal and induce the programmable delay on the reference signal thereby generating the delayed reference signal; and an analog delay measurement circuit configured to inject a test signal into the analog signal path, receive a delayed test signal from the analog signal path, measure the analog delay based on the delayed test signal, and generate a configuration signal configured to adjust the programmable delay of the programmable delay circuit according to the measured analog delay.

One or more embodiments provide a method for controlling an oscillator structure configured to oscillate about a rotation axis according to a driving signal. The method includes driving the oscillator structure to oscillate about a rotation axis according to a driving signal; generating, by a phase error detector, a phase error signal based on a delayed event time signal and delayed reference signal, wherein the delayed event time signal indicates measured event times of the oscillator structure oscillating about the rotation axis and the delayed reference signal indicates expected event times of the oscillator structure oscillating about the rotation axis; inducing, by an analog signal path, an analog delay on the event time signal thereby generating the delayed event time signal, wherein the analog signal path is coupled between the oscillator structure and the phase error detector; generating a reference signal that indicates the expected event times; generating the driving signal to drive an oscillation of the oscillator structure based on the phase error signal; inducing a programmable delay on the reference signal thereby generating the delayed reference signal; injecting a test signal into the analog signal path; inducing, by the analog signal path, the analog delay on the test signal thereby generating the delayed test signal; measuring the analog delay based on the injected test signal and the delayed test signal; and generating a configuration signal configured to adjust the programmable delay according to the measured analog delay.

One or more embodiments provide a Light Detection and Ranging (LIDAR) control system that includes a microelectromechanical system (MEMS) mirror configured to oscillate about a rotation axis; a phase error detector configured to generate a phase error signal based on a delayed event time signal and delayed reference signal, wherein the delayed event time signal indicates measured event times of the MEMS mirror oscillating about the rotation axis and the delayed reference signal indicates expected event times of the MEMS mirror oscillating about the rotation axis; an analog signal path coupled between the MEMS mirror and the phase error detector, the analog signal path configured to receive an event time signal indicating the measured event times and induces an analog delay on the event time signal thereby generating the delayed event time signal; a control circuit configured to generate a reference signal that indicates the expected event times and generate a driving signal to drive an oscillation of the MEMS mirror based on the phase error signal; a programmable delay circuit configured with a programmable delay, the programmable delay circuit configured to receive the reference signal and induce the programmable delay on the reference signal thereby generating the delayed reference signal; and an analog delay measurement circuit configured to inject a test signal into the analog signal path, receive a delayed test signal from the analog signal path, measure the analog delay based on the delayed test signal, and generate a configuration signal configured to adjust the programmable delay of the programmable delay circuit according to the measured analog delay.

BRIEF DESCRIPTION OF THE DRAWINGS

Embodiments are described herein making reference to the appended drawings.

DETAILED DESCRIPTION

In the following, various embodiments will be described in detail referring to the attached drawings. It should be noted that these embodiments serve illustrative purposes only and are not to be construed as limiting. For example, while embodiments may be described as comprising a plurality of features or elements, this is not to be construed as indicating that all these features or elements are needed for implementing embodiments. Instead, in other embodiments, some of the features or elements may be omitted, or may be replaced by alternative features or elements. Additionally, further features or elements in addition to the ones explicitly shown and described may be provided, for example conventional components of sensor devices.

Features from different embodiments may be combined to form further embodiments, unless specifically noted otherwise. Variations or modifications described with respect to one of the embodiments may also be applicable to other embodiments. In some instances, well-known structures and devices are shown in block diagram form rather than in detail in order to avoid obscuring the embodiments.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

Connections or couplings between elements shown in the drawings or described herein may be wire-based connections or wireless connections unless noted otherwise. Furthermore, such connections or couplings may be direct connections or couplings without additional intervening elements or indirect connections or couplings with one or more additional intervening elements, as long as the general purpose of the connection or coupling, for example to transmit a certain kind of signal or to transmit a certain kind of information, is essentially maintained.

In the present disclosure, expressions including ordinal numbers, such as "first", "second", and/or the like, may modify various elements. However, such elements are not limited by the above expressions. For example, the above expressions do not limit the sequence and/or importance of the elements. The above expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

Embodiments relate to optical sensors and optical sensor systems and to obtaining information about optical sensors and optical sensor systems. A sensor may refer to a component which converts a physical quantity to be measured to an electric signal, for example a current signal or a voltage signal. The physical quantity may, for example, comprise electromagnetic radiation, such as visible light, infrared (IR) radiation, or other type of illumination signal, a current, or a voltage, but is not limited thereto. For example, an image sensor may be a silicon chip inside a camera that converts photons of light coming from a lens into voltages. The larger the active area of the sensor, the more light that can be collected to create an image.

A sensor device as used herein may refer to a device which comprises a sensor and further components, for example biasing circuitry, an analog-to-digital converter or a filter. A sensor device may be integrated on a single chip, although in other embodiments a plurality of chips or also components external to a chip may be used for implementing a sensor device.

In Light Detection and Ranging (LIDAR) systems, a light source transmits light pulses into a field of view and the light reflects from one or more objects by backscattering. In particular, LIDAR is a direct Time-of-Flight (TOF) system in which the light pulses (e.g., laser beams of infrared light) are emitted into the field of view, and a pixel array detects and measures the reflected beams. For example, an array of photodetectors receives reflections from objects illuminated by the light.

Differences in return times for each light pulse across multiple pixels of the pixel array can then be used to make digital 3D representations of an environment or to generate other sensor data. For example, the light source may emit a single light pulse, and a time-to-digital converter (TDC) electrically coupled to the pixel array may count from the time the light pulse is emitted, corresponding to a start signal, until a time the reflected light pulse is received at the receiver (i.e., at the pixel array), corresponding to a stop signal. The "time-of-flight" of the light pulse is then translated into a distance.

In another example, an analog-to-digital converter (ADC) may be electrically coupled to the pixel array (e.g., indirectly coupled with intervening elements in-between) for pulse detection and TOF measurement. For example, an ADC may be used to estimate a time interval between start/stop signals with an appropriate algorithm. For example, an ADC may be used detect an analog electrical signal from one or more photodiodes to estimate a time interval between a start signal (i.e., corresponding to a timing of a transmitted light pulse) and a stop signal (i.e., corresponding to a timing of receiving an analog electrical signal at an ADC) with an appropriate algorithm.

A scan such as an oscillating horizontal scan (e.g., from left to right and right to left of a field of view) or an oscillating vertical scan (e.g., from bottom to top and top to bottom of a field of view) can illuminate a scene in a continuous scan fashion. Each firing of the laser beam by the light sources can result in a scan line in the "field of view."

By emitting successive light pulses in different scanning directions, an area referred to as the field of view can be scanned and objects within the area can be detected and imaged. Thus, the field of view represents a scanning plane having a center of projection. A raster scan could also be used.

Figure 1:
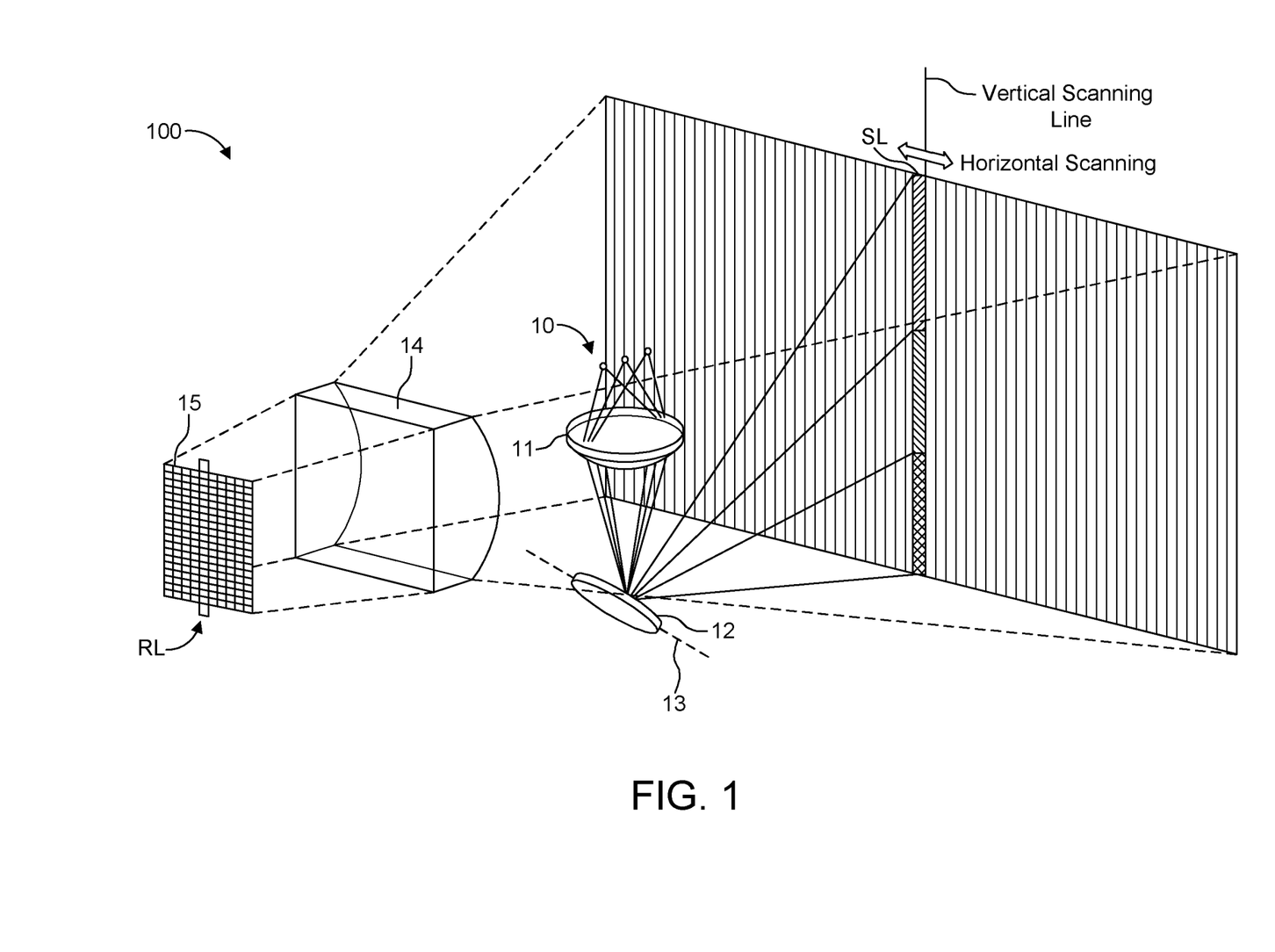
FIG. 1 is a schematic diagram of a LIDAR scanning system in accordance with one or more embodiments.

FIG. 1 is a schematic diagram of a LIDAR scanning system 100 in accordance with one or more embodiments. The LIDAR scanning system 100 is an optical scanning device that includes a transmitter, including an illumination unit 10, a transmitter optics 11, and a one-dimensional (1D) microelectromechanical system (MEMS) mirror 12, and a receiver, including a second optical component 14 and a photodetector detector array 15.

The illumination unit 10 includes multiple light sources (e.g., laser diodes or light emitting diodes) that are linearly aligned in single bar formation and are configured to transmit light used for scanning an object. The light emitted by the light sources is typically infrared light although light with another wavelength might also be used. As can be seen in the embodiment of FIG. 1, the shape of the light emitted by the light sources is spread in a direction perpendicular to the transmission direction to form a light beam with an oblong shape perpendicular to a transmission. The illumination light transmitted from the light sources are directed towards the transmitter optics 11 configured to focus each laser onto a one-dimensional MEMS mirror 12. The transmitter optics 11 may be, for example, a lens or a prism.

When reflected by the MEMS mirror 12, the light from the light sources are aligned vertically to form for each emitted laser shot a one-dimensional vertical scanning line SL of infrared light or a vertical bar of infrared light. Each light source of the illumination unit 10 contributes to a different vertical region of the vertical scanning line SL. Thus, the light sources may be concurrently activated and concurrently deactivated to obtain a light pulse with multiple segments, where each segment corresponds to a respective light source, However, each vertical region or segment of the vertical scanning line SL may also be independently active or inactive by turning on or off a corresponding one of the light sources of the illumination unit 10. Thus, a partial or full vertical scanning line SL of light may be output from the system 100 into the field of view.

Accordingly, the transmitter of the system 100 is an optical arrangement configured to generate laser beams based on the laser pulses, the laser beams having an oblong shape extending in a direction perpendicular to a transmission direction of the laser beams.

In addition, while three laser sources are shown, it will be appreciated that the number of laser sources are not limited thereto. For example, the vertical scanning line SL may be generated by a single laser source, two laser sources, or more than three laser sources.

The MEMS mirror 12 is a mechanical moving mirror (i.e., a MEMS micro-mirror) integrated on a semiconductor chip (not shown). The MEMS mirror 12 according to this embodiment is configured to rotate about a single scanning axis and can be said to have only one degree of freedom for scanning. Distinguished from 2D-MEMS mirrors (2D MEMS scanners), in the 1D MEMS mirror, the single scanning axis is fixed to a non-rotating substrate and therefore maintains its spatial orientation during the oscillation of the MEMS mirror. Thus, a 1D oscillating MEMS mirror is by design more robust against vibrations and shocks than 2D MEMS mirror solutions. Due to this single scanning axis of rotation, the MEMS mirror 12 is referred to as a 1D MEMS mirror or 1D MEMS scanner.

While embodiments describe using 1D oscillating MEMS mirrors, the measurement methods described herein can be extended to 2D MEMS mirrors as well. In this case, both axes of a single 2D MEMS mirror are controlled by a different phase-locked loops (PLLs) such that an analog delay of a 2D MEMS mirror according to a first scanning axis is measured and compensated according to any of the techniques described herein, and an analog delay of the 2D MEMS mirror according to a second scanning axis is measured and compensated according to any of the techniques described herein. It is further possible that the different PLLs are provided in separate MEMS drivers or integrated into a single MEMS driver for a 2D MEMS mirror.

The MEMS mirror 12 itself is a non-linear resonator (i.e., a resonant MEMS mirror) configured to oscillate "side-to-side" about a scanning axis 13 at a resonance frequency such that the light reflected from the MEMS mirror 12 (i.e., the vertical scanning line of light) oscillates back and forth in a horizontal scanning direction. The MEMS mirror 12 is more strongly non-linear due to the stiffening of its suspension. A scanning period or an oscillation period is defined, for example, by one complete oscillation from a first edge of the field of view (e.g., left side) to a second edge of the field of view (e.g., right side) and then back again to the first edge. A mirror period of the MEMS mirror 12 corresponds to a scanning period.

Thus, the field of view is scanned in the horizontal direction by the vertical bar of light by changing the angle of the MEMS mirror 12 on its scanning axis 13. For example, the MEMS mirror 12 may be configured to oscillate at a resonance frequency of 2 kHz, between +/−15 degrees to steer the light over +/−30 degrees making up the scanning range of the field of view. Thus, the field of view may be scanned, line-by-line, by a rotation of the MEMS mirror 12 through its degree of motion. One such sequence through the degree of motion (e.g., from −15 degrees to +15 degrees) is referred to as a single scan or scanning cycle. Multiple scans may be used to generate distance and depth maps, as well as 3D images by a processing unit.

While the transmission mirror is described in the context of a MEMS mirror, it will be appreciated that other oscillating mirrors can also be used. In addition, the resonance frequency or the degree of rotation is not limited to 2 kHz and +/−15 degrees, respectively, and both the resonance frequency and the field of view may be increased or decreased according to the application. Thus, a scanning mirror is configured to oscillate about a scanning axis and direct the laser beams at different directions into a field of view. Hence, a transmission technique includes transmitting the beams of light into the field of view from a transmission mirror that oscillates about a scanning axis such that the beams of light are projected as a vertical scanning line SL into the field of view that moves horizontally across the field of view as the transmission mirror oscillates about the single scanning axis.

Upon impinging one or more objects, the transmitted bar of vertical light is reflected by backscattering back towards the LIDAR scanning system 100 as a reflected vertical line where the second optical component 14 (e.g., a lens or prism) receives the reflected light. The second optical component 14 directs the reflected light onto the photodetector detector array 15 that receives the reflected light as a receiving line RL and is configured to generate electrical measurement signals. The electrical measurement signals may be used for generating a 3D map of the environment and/or other object data based on the reflected light (e.g., via TOF calculations and processing).

The receiving line is shown as a vertical column of light that extends along one of the pixel columns in a lengthwise direction of the pixel column. The receiving line has three regions that correspond to the vertical scanning line SL shown in FIG. 1. As the vertical scanning line SL moves horizontally across the field of view, the vertical column of light RL incident on the 2D photodetector array 15 also moves horizontally across the 2D photodetector array 15. The reflected light beam RL moves from a first edge of the photodetector detector array 15 to a second edge of the photodetector detector array 15 as the receiving direction of the reflected light beam RL changes. The receiving direction of the reflected light beam RL corresponds to a transmission direction of the scanning line SL.

The photodetector array 15 can be any of a number of photodetector types; including avalanche photodiodes (APD), silicon photomultipliers (SiPM), photocells, and/or other photodiode devices. Imaging sensors such as charge-coupled devices (CCDs) can be the photodetectors. In the examples provided herein, the photodetector array 15 is a two-dimensional (2D) APD array that comprises an array of APD pixels. In other embodiments, the photodetector array 15 may be a 1D array that includes a single column of photodiodes. The activation of the photodiodes may be synchronized with light pulses emitted by the illumination unit 10. Alternatively, a single photo detector cell/pixel, as opposed to an array, may be used. For example, a single photo detector cell/pixel may be used in case of a 2×1D scanning transmitter in a coaxial LIDAR architecture.

The photodetector array 15 receives reflective light pulses as the receiving line RL and generates electrical signals in response thereto. Since the time of transmission of each light pulse from the illumination unit 10 is known, and because the light travels at a known speed, a time-of-flight computation using the electrical signals can determine the distance of objects from the photodetector array 15. A depth map can plot the distance information.

In one example, for each distance sampling, a microcontroller triggers a laser pulse from each of the light sources of the illumination unit 10 and also starts a timer in a Time-to-Digital Converter (TDC) Integrated Circuit (IC). The laser pulse is propagated through the transmission optics, reflected by the target field, and captured by an APD of the APD array 15. The APD emits a short electrical pulse which is then amplified by an electrical signal amplifier. A comparator IC recognizes the pulse and sends a digital signal to the TDC to stop the timer. The TDC uses a clock frequency to calibrate each measurement. The TDC sends the serial data of the differential time between the start and stop digital signals to the microcontroller, which filters out any error reads, averages multiple time measurements, and calculates the distance to the target at that particular field position. By emitting successive light pulses in different directions established by the MEMS mirror, an area (i.e., a field of view) can be scanned, a three-dimensional image can be generated, and objects within the area can be detected.

Alternatively, instead of using the TDC approach, ADCs may be used for signal detection and TOF measurement. For example, each ADC may be used detect an analog electrical signal from one or more photodiodes to estimate a time interval between a start signal (i.e., corresponding to a timing of a transmitted light pulse) and a stop signal (i.e., corresponding to a timing of receiving an analog electrical signal at an ADC) with an appropriate algorithm.

It will be appreciated that the above-described horizontal scanning system 100 may also be used for vertical scanning. In this case, the scanning arrangement is arranged such that the scanning direction is rotated 90° such that the scanning line SL and the receiving line RL move in the vertical direction (i.e., from top to bottom or from bottom to top). As such, the scanning line is a horizontal scanning line SL that is projected into the field of view that moves vertically across the field of view as the transmission mirror oscillates about the single scanning axis. Furthermore, as the horizontal scanning line SL moves vertically across the field of view, the horizontal column of light RL incident on the 2D photodetector array 15 also moves vertically across the 2D photodetector array 15.

It will be further appreciated that a LIDAR scanning system may include multiple scanning mirrors 12 and corresponding circuitry for scanning different field of views in the horizontal and/or vertical direction. For example, a vehicle may include multiple scanning mirrors arranged at different locations on the vehicle to scan different field of views. Alternatively, the synchronized MEMS mirrors can be used in a 2×1D system, such as a Lissajous scanning system. In this case, the MEMS mirrors are mounted in the same location in the vehicle and are configured to scan a same field of view.

Figure 2:
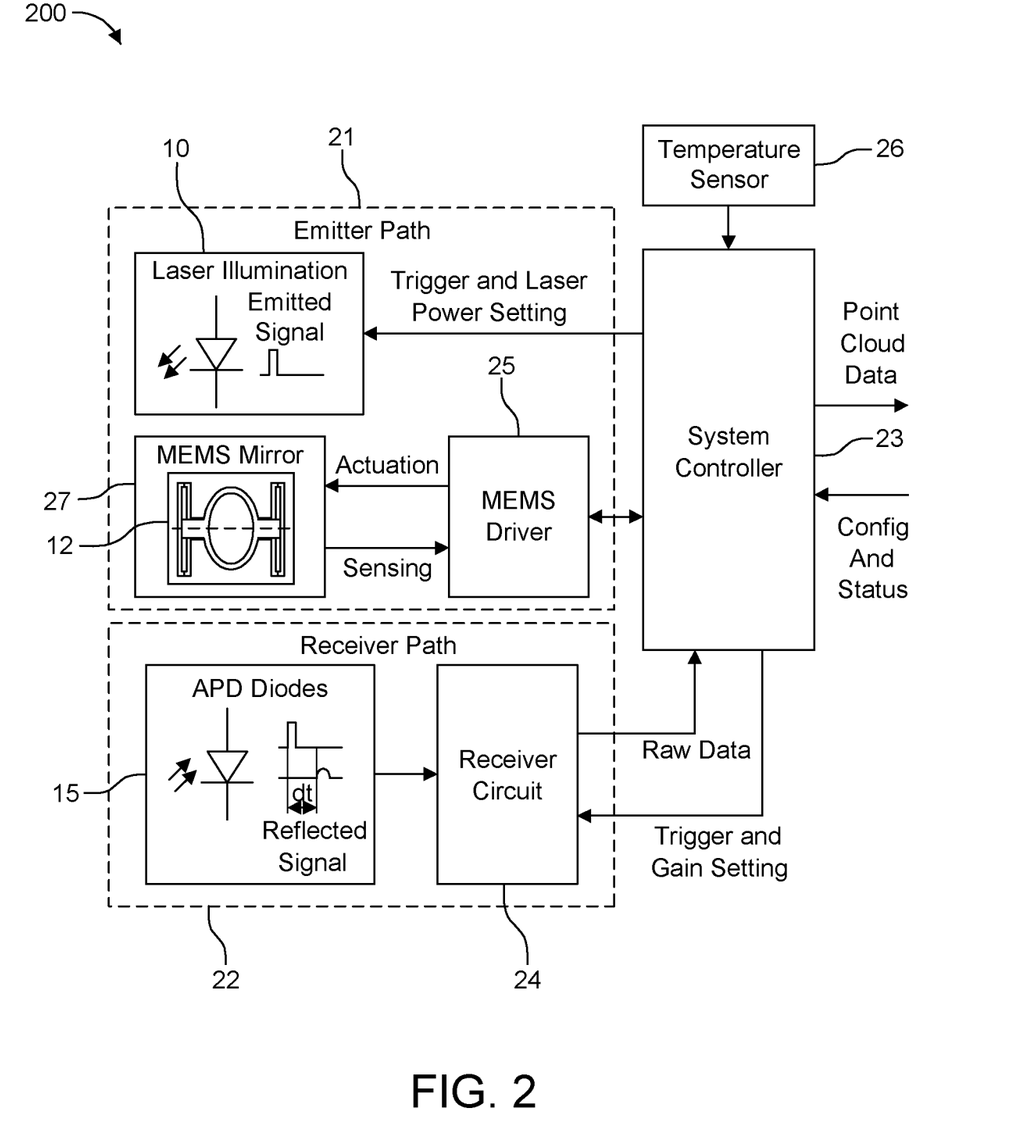
FIG. 2 is a schematic block diagram of the LIDAR scanning system in accordance with one or more embodiments.

FIG. 2 is a schematic block diagram of the LIDAR scanning system 200 in accordance with one or more embodiments. In particular, FIG. 2 shows additional features of the LIDAR scanning system 200, including example processing and control system components such as a MEMS driver, a receiver circuit, and a system controller.

The LIDAR scanning system 200 includes a transmitter unit 21 that is responsible for an emitter path of the system 200, and a receiver unit 22 that is responsible for a receiver path of the system 200. The system also includes a system controller 23 that is configured to control components of the transmitter unit 21 and the receiver unit 22, and to receive raw data from the receiver unit 22 and perform processing thereon (e.g., via digital signal processing) for generating object data (e.g., point cloud data). Thus, the system controller 23 includes at least one processor and/or processor circuitry for processing data, as well as control circuitry, such as a microcontroller, that is configured to generate control signals. The LIDAR scanning system 200 may also include a temperature sensor 26.

The MEMS mirror 12 may be assembled in a chip package 27 shown in FIG. 2 to protect the mirror. For example, the MEMS mirror 12 may be hermetically sealed at a low pressure (i.e., at a pressure lower than atmospheric pressure) in a chip package. This low pressure may provide a low damping environment in which the MEMS mirror 12 operates.

The receiver unit 22 includes the photodetector array 15 as well as a receiver circuit 24. The receiver circuit 24 may include one or more circuitries or sub-circuitries for receiving and/or processing information. The receiver circuit 24 may receive the analog electrical signals from the APD diodes of the photodetector array 15 and transmit the electrical signals as raw analog data or raw digital data to the system controller 23. In order to transmit the raw data as digital data, the receiver circuit 24 may include an ADC and a field programmable gate array (FPGA). The receiver circuit 24 may also receive trigger control signals from the system controller 23 that triggers an activation of one or more APD diodes. The receiver circuit 24 may also receive gain setting control signals for controlling the gain of one or more APD diodes.

The transmitter unit 21 includes the illumination unit 10, the MEMS mirror 12, and a MEMS driver 25 configured to drive the MEMS mirror 12. In particular, the MEMS driver 25 actuates and senses the rotation position of the mirror, and provides position information (e.g., tilt angle or degree of rotation about the rotation axis) of the mirror to the system controller 23. Based on this position information, the laser sources of the illumination unit 10 are triggered by the system controller 23 and the photodiodes (e.g., APD diodes) are activated to sense, and thus measure, a reflected light signal. Thus, a higher accuracy in position sensing of the MEMS mirror results in a more accurate and precise control of other components of the LIDAR system.

The MEMS driver 25 may also measure and record mirror frequency and currents using a change in capacitance in a comb-drive rotor and stator of an actuator structure used to drive the MEMS mirror 12. The actuator structure of the MEMS mirror 12 further includes a suspension structure that suspends the MEMS mirror 12 within a mirror frame body. Thus, the MEMS driver 25 may further include a measurement circuit configured to measure one or more characteristics of the MEMS mirror 12 described herein. The MEMS driver 25 may further include processing circuitry, including at least one processor (e.g., analog signal processing circuitry and/or digital signal processing circuitry) configured to process measurement information from the measurement circuit to evaluate a mechanical health of the MEMS mirror 12 and/or the state of the chip package.

Additionally, or alternatively, the system controller 23 may receive measurement information from the measurement circuit of the MEMS driver 25 and perform processing thereon. Thus, system controller 23 may further include processing circuitry, including at least one processor (e.g., analog signal processing circuitry and/or digital signal processing circuitry) configured to process measurement information from the measurement circuit to evaluate a mechanical health of the MEMS mirror 12 and/or the state of the chip package.

By sensing the rotation position of the MEMS mirror 12 about its rotation axis 13, the MEMS driver 25 can sense zero-crossing (ZC) events of the MEMS mirror 12. A zero-crossing event is an instance when the MEMS mirror 12 has a rotation angle of 0° on its rotation axis 13. Specifically, it is the moment when the MEMS mirror 12 is parallel to the frame or in a neutral position. The neutral position may also be referred to as a resting position (e.g., when the MEMS mirror 12 comes to a stop after turning off the driving force). Since the MEMS mirror 12 oscillates back and forth between two rotation directions (e.g., clockwise and counter-clockwise), a zero-crossing event occurs twice during a scanning period—once as the mirror oscillates in the first rotation direction and once as the mirror oscillates in the second rotation direction. It will also be appreciated that angle-crossing events at another predefined angle may also be used instead of a zero-crossing event.

In some embodiments, an event time may correspond to a non-zero-crossing event. For example, the sensed rotation angle may be some angle other than 0°. However, for the purpose of explanation, examples herein will be described in the context of sensing zero-crossing events.

The MEMS driver 25 is configured to detect each zero-crossing event and record a timing for each event. This timing information (i.e., measured zero-crossing time) can then be transmitted to the system controller 23 as position information. Specifically, the MEMS driver 25 triggers a change in the output of a position signal (Position_L) at each zero-crossing event or angle-crossing event.

Figure 3:
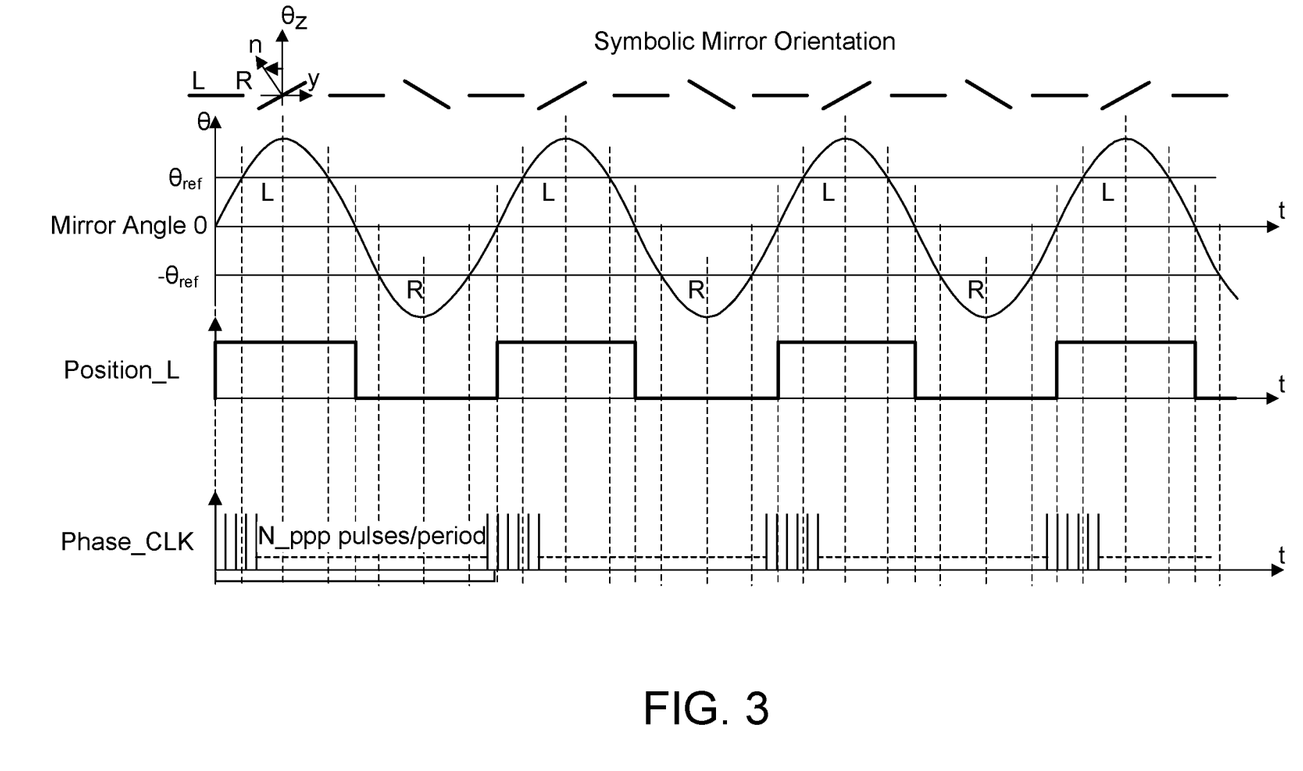
FIG. 3 illustrates a signal diagram of various signals generated by a MEMS driver based on a mirror angle θ and/or position according to one or more embodiments.

FIG. 3 illustrates a signal diagram of various signals generated by a MEMS driver 25 based on the mirror angle θ and/or position, including a position signal (Position_L). For example, the position signal (Position_L) may be a pulsed signal during which a first pulse transition (e.g., falling-edge transition) is triggered at a zero-crossing as the mirror oscillates in a first rotation direction (e.g., from left to right) and a second pulse transition (e.g., rising-edge transition) is triggered at a zero-crossing as the mirror oscillates in a second rotation direction (e.g., from right to left). Furthermore, the signal is "high" when the mirror points in one direction (e.g., points left) and the signal is "low" when the mirror points in a second direction (e.g., points right). Thus, the position signal not only indicates a zero-crossing event by triggering a pulse transition, but also indicates absolute phase information by indicating the directional tilt of the mirror. As the interval between zero-crossing events increase, so does the frequency of the position signal. Based on this position signal both a phase and/or a frequency of two or more position signals can be compared.

Alternatively, a short pulse may be generated by the MEMS driver 25 at the each zero-crossing event such that a pulsed position signal (Position_L) is output to the system controller 23. That is, the signal remains low (or high) between zero-crossing pulses. In this case, the absolute phase information indicates which direction the mirror is moving would be absent. Based on this position signal a phase and/or a frequency of two or more position signals can be compared.

The MEMS driver 25 may send the position information to the system controller 23 so that the system controller 23 can use the position information to control the triggering of the laser pulses of the illumination unit 10 and the activation of the photodiodes of the photodetector array 15. The position information may also be used by the system controller as feedback information such that the system controller 23 can maintain a stable operation of the MEMS mirror 12 via control signals provided to the MEMS driver 25 and also maintain synchronization with other MEMS mirrors.

The timing information of the zero-crossing events may also be used by the MEMS driver 25 to generate a phase clock signal (Phase_CLK). The phase clock signal is a high frequency signal (e.g., 14 MHz) of a fixed number of pulses that provides fine-grained phase information of the MEMS mirror 12. In this case, the mirror movement is divided into equidistant slices (affected by quantization errors of a digitally controlled oscillator (DCO) frequency generator) in the time-domain. A "slice" may be regarded as a subsection of a time interval between two consecutive zero-crossing events. Specifically, the time interval between two zero-crossing events (i.e., between two Position_L signals or pulses) is divided into identical fractions such that a signal pulse is generated at each fraction. Thus, the phase clock signal is pulse signal whose frequency depends on the time interval between two zero-crossing events, where the shorter the time interval, the higher the frequency. Thus, the phase clock signal divides the mirror movement in a well-defined number of phase-slices. The MEMS driver 25 may generate and output the phase clock signal to the system controller 23.

FIG. 3 further illustrates a phase clock signal (Phase_CLK) comprising a number of pulses per oscillation period, where the oscillation period is defined by a time interval between two consecutive zero-crossing events.

The MEMS mirror 12 includes an actuator structure used to drive the mirror. The actuator structure includes interdigitated finger electrodes made of interdigitated mirror combs and frame combs to which a drive voltage (i.e., an actuation or driving signal) is applied by the MEMS driver 25. The drive voltage may be referred to as a high-voltage (HV). The drive voltage applied to the finger structure generates a corresponding capacitance. The drive voltage across the finger structure creates a driving force between interdigitated mirror combs and the frame combs, which creates a torque on the mirror body about the rotation axis. The drive voltage HV can be switched or toggled on and off (HV on/off) resulting in an oscillating driving force. The oscillating driving force causes the mirror to oscillate back and forth on its rotation axis between two extrema. Depending on the configuration, this actuation can be regulated or adjusted by adjusting the drive voltage off time, a voltage level of the drive voltage, or a duty cycle.

In other embodiments, an electromagnetic actuator may be used to drive the MEMS mirror 12. For an electromagnetic actuator, a driving current (i.e., an actuation or driving signal) may be used to generate the oscillating driving force. Thus, it will be appreciated that drive/driving voltage and drive/driving current may be used interchangeably herein to indicate an actuation signal or a driving signal, and both may generally be referred to as a driving force.

As the mirror oscillates, the capacitance between the finger electrodes changes according to the mirror's rotation position. The MEMS driver 25 is configured to measure the capacitance between the interdigitated finger electrodes, and determine a rotation position or angle position of the MEMS mirror 12 therefrom. By monitoring the capacitance, the MEMS driver 25 can detect the zero-crossing events and a timing thereof, and can determine the tilt angle of the MEMS mirror 12 at any given moment. The MEMS driver 25 can also use the measured capacitance to determine a mirror frequency, and record the information in memory at the MEMS driver 25 or at the system controller 23.

The sensing of the position of the MEMS mirror 12 is performed based on a detector that is configured to measure the capacitance. For example, as the MEMS mirror moves, the geometry of the finger structure changes, resulting in a change in the geometry of the capacitance. As the geometry of the capacitance changes, the capacitance itself changes. Thus, a specific capacitance corresponds directly with a specific position (i.e., tilt angle) of the MEMS mirror. By sensing the capacitance of the finger structure, the MEMS driver 25 can monitor and track the oscillations of the mirror, and determine a specific position of the MEMS mirror, including the zero-crossing.

One way to measure the capacitance is to measure a current flowing through the finger structure, convert the measured current into a voltage, and then further correlate the voltage to a capacitance and/or a rotation angle. However, any method to measure the capacitance may be used. A rotation direction (e.g., positive or negative, left-to-right or right-to-left, clockwise or counter-clockwise, etc.) is also detected by measuring a change in capacitance over time, where a positive or a negative change indicates opposing rotation directions. The MEMS driver 25 can also record the currents and voltages measured during the measuring of the capacitance. Thus, increasing the accuracy of position sensing of the mirror may improve the overall accuracy of the LIDAR system Since the mirror is driven at an oscillation frequency (e.g., 2 kHz), when the mirror rotates in a first rotation direction (e.g., left-to-right or clockwise), it crosses a zero position (i.e., 0°) at a certain point of time. The same can be said when the mirror rotates in a second rotation direction (e.g., right-to-left or counter-clockwise), the mirror will cross the zero position at a certain point in time. These instances of crossing the zero position may be referred to as zero-crossing events which occur at zero-crossing times.

Figure 4:
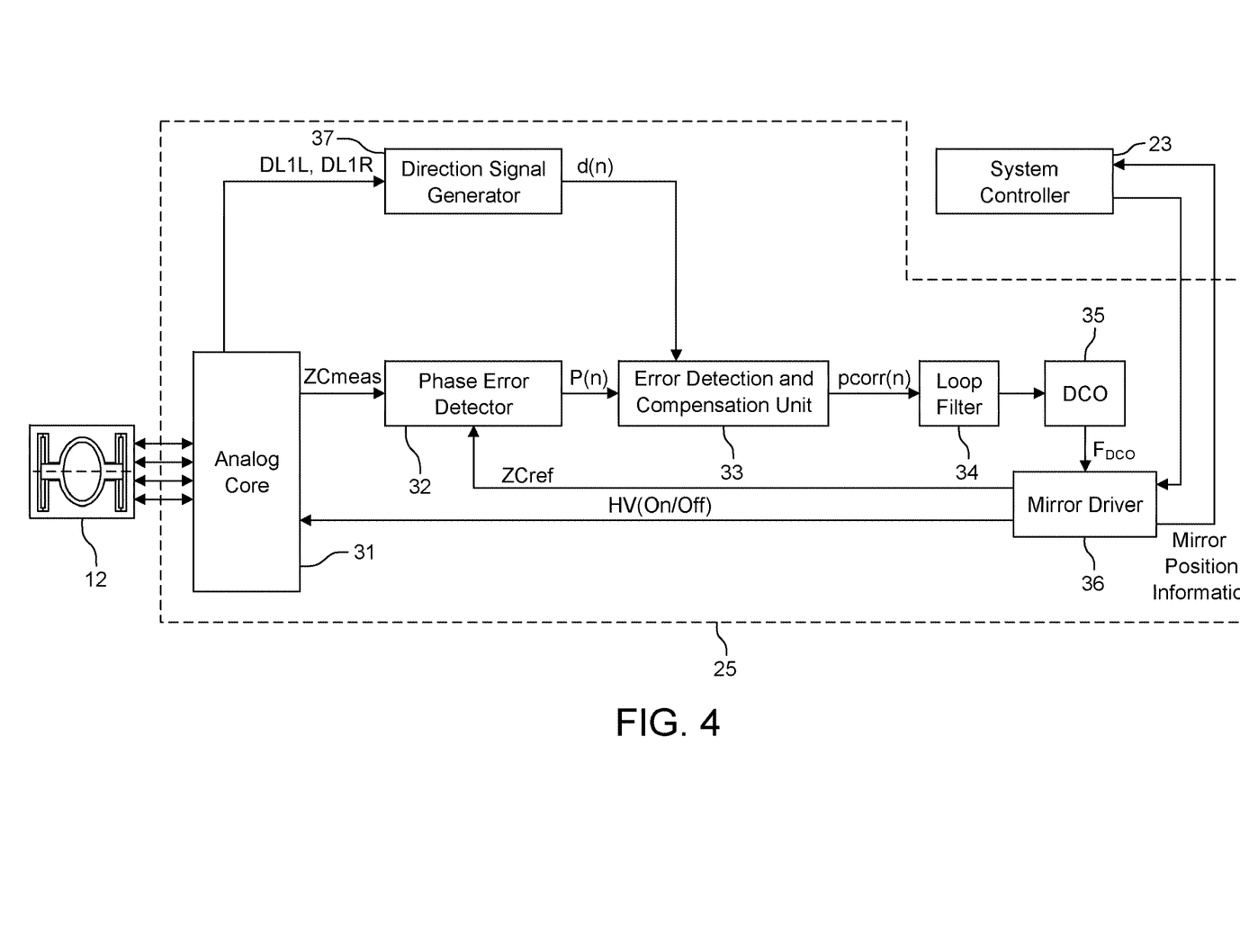
FIG. 4 shows a schematic block diagram of a MEMS driver according to one or more embodiments.

FIG. 4 shows a schematic block diagram of a MEMS driver according to one or more embodiments. The MEMS driver 25 includes an analog core 31, a phase error detector 32, an error detection and compensation unit 33, a loop filter 34, a digitally controlled oscillator (DCO) 35, and a mirror driver 36 arranged in a loop. This loop, together with the MEMS mirror 12, forms a phase-locked loop (PLL) that follows the frequency of the MEMS mirror 12. The MEMS driver 25 further includes a direction signal generator 37 and a chopping signal generator 38. However, it will be appreciated that the direction signal generator 37 and the chopping signal generator 38 may also be provided outside of the MEMS driver 25. The MEMS driver 25 is in electrical communication with the MEMS mirror 12 and the system controller 23 via electrical connections that are used to transmit signals therebetween.

Thus, the MEMS driver 25 implements analog circuitry and digital circuitry. The analog circuitry (i.e., the analog core 31) includes one or more inputs and outputs connected to the MEMS mirror 12. For example, one or more inputs of the analog core 31 may receive analog signals from the MEMS mirror 12 related to the position and rotation direction of the mirror. In addition, one or more outputs of the analog core 31 may provide control signals to the MEMS mirror 12 for controlling the oscillation of the mirror.

The analog core 31 includes analog circuitry configured to measure the capacitance of the finger structure of the MEMS mirror actuator in order to measure timing-critical events, such as zero-crossings with the aid of comparators. Thus, the analog circuitry measures a position of the MEMS mirror 12 about a rotation axis and determines zero-crossing times in a first rotation direction and in a second rotation direction. The analog circuitry is also configured to generate direction information DL1L and DL1R related to the direction of rotation (e.g., clockwise or counter-clockwise) of the MEMS mirror 12. The remaining, digital circuitry implements the chip's intelligence (control of mirror, laser pulse triggering, photodiode activation triggering, etc.). This approach enables digital signal processing solutions in order to detect systematic and non-systematic error sources which can then be compensated.

The analog core 31 is configured to generate and output measured zero-crossing times ZCmeas of the MEMS mirror 12, which is received by the phase error detector 32. The analog core 31 is further configured to provide direction information DL1L and DL1R related to the direction of rotation (e.g., clockwise or counter-clockwise) of the MEMS mirror 12 to the direction signal generator 37, which is configured to generate a direction signal d(n) (e.g., +1 or −1) based on the direction information DL1L and DL1R.

The phase error detector 32 is configured to receive the measured zero-crossing times ZCmeas from the analog core 31 and reference zero-crossing times ZCref from the mirror driver 36. The reference zero-crossing times ZCref are expected zero-crossing times of the MEMS mirror 12 based on the oscillation frequency of the mirror. The reference zero-crossing times ZCref are generated by the mirror driver 36 (i.e., by the PLL).

The phase error detector 32 includes comparator circuitry that is configured to compare the measured (actual) zero-crossing times ZCmeas and the reference zero-crossing times ZCref, and output a difference thereof. Thus, the phase error detector 32 is configured to compare the measured zero-crossing timing with an expected zero-crossing timing, and generate an error signal p(n) representative of the difference between the measured zero-crossing timing and the expected zero-crossing timing. In other words, the phase error signal p(n) represents the phase error between the measured zero-crossing times ZCmeas and the reference zero-crossing times ZCref. The phase error signal p(n) is actively output for each zero-crossing of the MEMS mirror 12.

For example, the phase error signal p(n) will be zero if measured zero-crossing time and expected zero-crossing time are equal. Otherwise, the phase error signal will be a non-zero value corresponding to the difference between the measured zero-crossing time and expected zero-crossing time.

In addition, the phase error signal p(n) is generated for both rotation directions of the mirror. For example, in the case that asymmetry exists, the phase error detector 32 may generate a phase error signal p(n) having a value of +3 corresponding to a first rotation direction, and may generate a phase error signal p(n) having a value of −3 corresponding to a second rotation direction. As long as the values are not equal for the two rotation directions, asymmetry exists.

Each pass of the MEMS mirror (i.e., from left-to-right or right-to-left) generates a value for the phase error signal p(n). In particular, any time the MEMS mirror 12 rotates past the zero-crossing, a timing of the zero-crossing is measured, and a phase error signal p(n) is generated based thereon in comparison to the expected zero-crossing time. Thus, the PLL error spectrum represents the output of the phase detector over time (i.e., the phase error signal over time).

The error detection and compensation unit 33 is configured to receive the phase error signal p(n) from the phase error detector 32, detect the periodic jitter components, remove the periodic jitter components from the phase error signal p(n) in order to generate a compensated phase error signal pcorr(n). The error detection and compensation unit 33 also receives the direction signal d(n) from the direction signal generator 37.

The compensated phase error signal pcorr(n) effectively reduces the jitter of the PLL, which enables higher precision in sensing and controlling the MEMS mirror 12 as well as enables higher precision in controlling the illumination unit 10. Specifically, removing the periodic jitter components from the phase error signal p(n) enables more accurate mirror position signaling (i.e., mirror position information), which enables more accurate laser shooting and more accurate controlling of the mirror.

The error detection and compensation unit 33 includes a DSP structure made of circuitry logic (e.g., adders, subtractors, multipliers, integrators, dividers, and the like) coupled to form a signal processing chain that is configured to detect and compensate periodic jitter components. In particular, the DSP structure is configured to measure and compensate the two prominent error sources of mirror asymmetry and chopping induced periodic jitter.

The corrected phase detector signal pcorr(n) is used to derive the signal $f_{DCO}$ of the DCO 35 and forms a basis for the mirror position information generated by the mirror driver 36. In particular, the error detection and compensation unit 33 outputs the corrected phase detector signal pcorr(n) to the loop filter 34, which implements either proportional-integral (PI) or proportional-integral-derivative (PID) control to increment the DCO 35 to adjust the phase of the DCO 35.

Because the periodic jitter components are absent from the corrected phase detector signal pcorr(n), the phase of signal $F_{DCO}$ of the DCO 35 is not influenced by these jitter components and more accurately corresponds to the phase of the MEMS mirror 12. The DCO 35 provides the signal $F_{DCO}$ to the mirror driver 36 based on the value of the DCO counter 35a.

The mirror driver 36 is a mirror scheduler that determines a subtiming of the MEMS mirror 12 based on the signal $F_{DCO}$. Thus, the mirror driver 36 includes at least one processor for performing timing analysis and scheduling. Based on the subtiming, the mirror driver 36 is configured to generate a drive voltage HV as a control signal to control the oscillation of the MEMS mirror 12. More specifically, the drive voltage HV (e.g., 100V) is toggled on and off, and is applied to the actuator structure of the MEMS mirror 12 as previously described above. The mirror driver 36 is not only configured to switch the driving voltage HV on and off, but may also drive the voltage to any level (e.g., full on, half-full off, etc.).

The mirror driver 36 determines mirror position information based on the signal $F_{DCO}$, and outputs the mirror position information to the system controller 23. The mirror position information actively indicates a position of the MEMS mirror 12. The system controller 23 may use the mirror position information to control the timing of the laser pulses of the illumination unit 10. The mirror position information may also be used to control the activation timing of the diodes of the photodetector array 15.

The mirror driver 36 may also determine the expected zero-crossing times ZCref based on the mirror position information.

Figure 5:
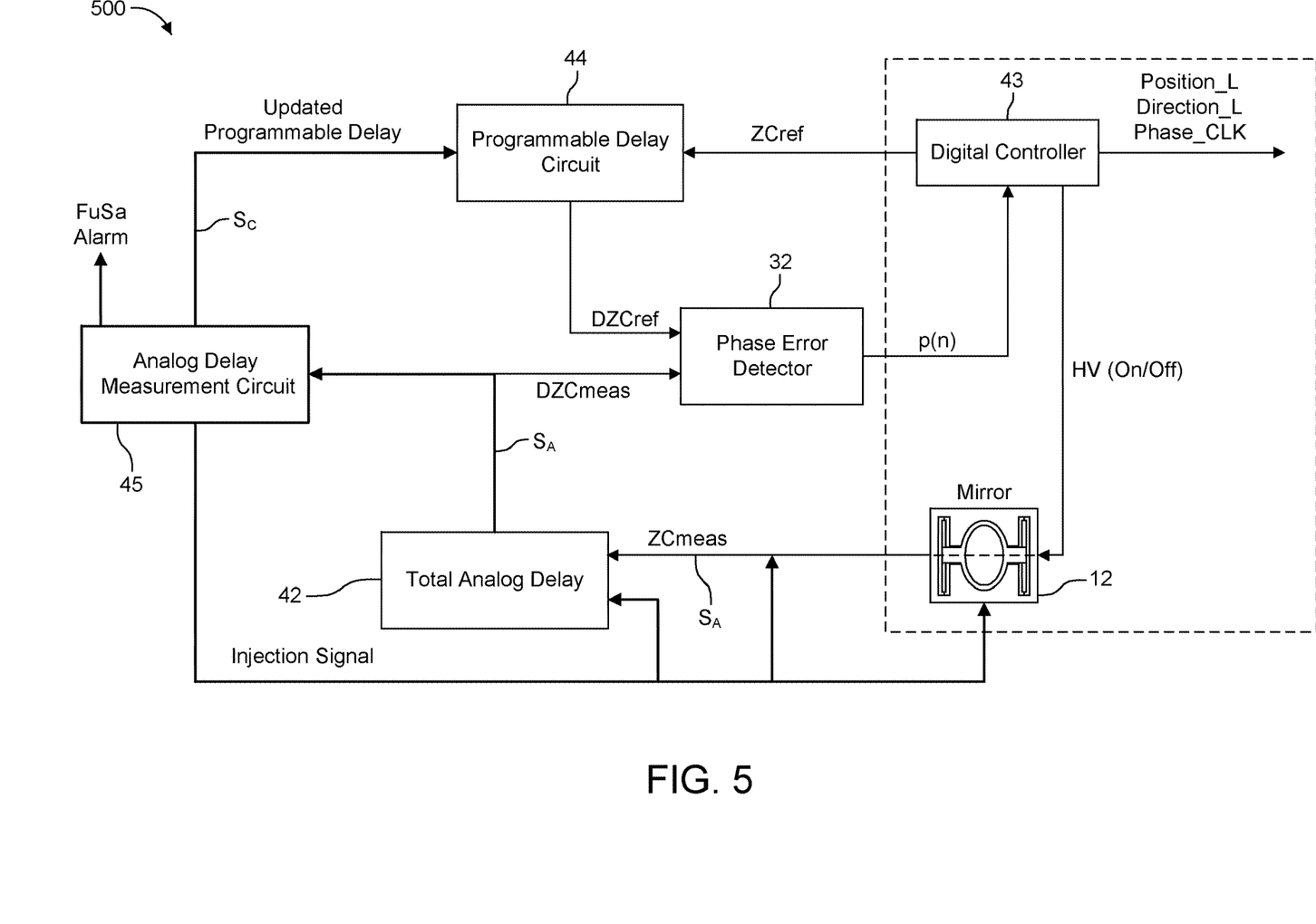
FIG. 5 is a schematic block diagram of a MEMS driving and position sensing system according to one or more embodiments.

FIG. 5 is a schematic block diagram of a MEMS driving and position sensing system 500 according to one or more embodiments. Specifically, the MEMS driving and position sensing system 500 may be implemented, at least in part, in the MEMS driver 25 shown in FIGS. 2 and 4. The MEMS driving and position sensing system 500 further includes the MEMS mirror 12 to which the MEMS driving and position sensing circuitry of system 500 is coupled.

As noted above, the MEMS mirror 12 itself includes an actuator structure used to drive the mirror about a scanning axis. The actuator structure also includes drive capacitors that are used by the sensing circuitry to measure a capacitance thereof to detect the rotation position or angle position of the MEMS mirror 12. A portion of a total analog delay in sensing the position information may be caused by the drive capacitors.

The MEMS driving and position sensing system 500 includes a phase error detector 32 (e.g., a phase comparator) as an input of a phase-locked loop (PLL) circuit that is used to synchronize the MEMS mirror 12. The phase error detector 32, which may be an analog or digital phase detector, is coupled to a sensing feedback path used to detect actual zero-crossings of the MEMS mirror 12. The sensing feedback path is an analog signal path $S_A$ that include various analog components (current clamps, transimpedance amplifiers (TIAs), low-pass filters, etc.) and printed circuit board (PCB) interconnects, each of which also contributes to a portion of the total analog delay in sensing the position information (e.g., the zero-crossing information). The analog sensing circuitry, including the analog core 31, of the sensing feedback path is configured to detect a zero-crossing at the MEMS mirror 12 and generate a zero-crossing signal ZCmeas indicating that a zero-crossing event has occurred.

Accordingly, analog delay block 42 is provided in the sensing feedback path and represents the total analog delay that occurs between the MEMS mirror 12 and the phase error detector 32. Thus, the timing of the actual zero-crossing signal corresponding to an actual zero-crossing detected during oscillation of the MEMS mirror 12 is delayed by the analog delay block 42. This delay by the analog delay block 42 results in a delayed zero-crossing signal (DZCmeas) received by the phase error detector 32. If the total analog delay of the delayed zero-crossing signal is compensated properly, then the sensed zero-crossing of the MEMS mirror 12 is signaled in a precise way to the laser shooting circuitry. However, as noted above, the analog delay is not static and requires real-time monitoring during a scanning operation and throughout the lifetime of the LIDAR system.

The MEMS driving and position sensing system 500 further includes a controller 43, which may be a digital controller, an analog controller, or a mix thereof. In the current example, the controller 43 is implemented as a digital controller, and may be a digital portion of the PLL that includes the phase error detector 32. Thus, the digital controller 43 may include the error detection and compensation unit 33, the loop filter 34, the DCO 35, and the mirror driver 36 arranged in a feedback loop with the MEMS mirror 12, the analog delay block 42, and the phase error detector 32. It is noted that the MEMS mirror 12 and the analog delay block 42, representative at least in part of the analog core 31, are part of a feedback path of the PLL.

The digital controller 43 generates a zero-crossing reference signal ZCref that indicates expected zero-crossing times of the oscillating MEMS mirror 12. For example, the digital controller 43 (i.e., the mirror driver 36) may determine expected zero-crossing times at which the MEMS mirror 12 is expected to have a zero-crossing based on its driven oscillation frequency, subtiming information, and a system model.

A programmable delay circuit 44 receives the zero-crossing reference signal ZCref from the digital controller 43 and compensates the zero-crossing reference signal ZCref, for example, by inducing a delay on the signal, based on an expected analog delay. The expected analog delay is programmed into programmable delay circuit 44 and is configurable as a programmable analog delay. In some examples, the programmable delay may account for both analog and/or digital delays.

As a result, the programmable delay circuit 44 generates a delayed zero-crossing reference signal (DZCref) based on the zero-crossing reference signal and the expected analog delay. The expected analog delay is intended to match the total analog delay of the analog delay block 42 such that the delay of the delayed zero-crossing reference signal (DZCref) is equal to the delay of the delayed zero-crossing signal (DZCmeas). When the delays are equal, the phases of the delayed zero-crossing reference signal (DZCref) and the delayed zero-crossing signal (DZCmeas) should be aligned with a phase difference of zero.

The phase error detector 32 is configured to receive the delayed zero-crossing reference signal (DZCref) and the delayed zero-crossing signal (DZCmeas), compare the phases thereof, and generate an error signal p(n) based on a phase difference or phase error between the two signals. The digital controller 43 is configured to receive the error signal p(n) and adjust the drive voltage HV based on the drive voltage HV such that the PLL and the MEMS mirror 12 are synchronized. For example, the output of the DCO may be adjusted to keep the phases of the delayed zero-crossing reference signal (DZCref) and the delayed zero-crossing signal (DZCmeas) matched.

The digital controller 43 is also configured to generate the position signal (Position_L) and the phase clock signal (Phase_CLK) based on signals extracted from the PLL. The digital controller 43 may also generate a direction signal (Direction_L) based on the position signal (Position_L), where the direction signal (Direction_L) indicates the rotation direction of the MEMS mirror 12. These signals are transmitted to the system controller 23 to improve the shooting accuracy (i.e., timing accuracy) of the transmitted laser beams relative to an angular position of the MEMS mirror 12.

The MEMS driving and position sensing system 500 further includes an analog delay measurement circuit 45. The delay measurement circuit 45 is configured to periodically generate and inject a trigger pulse (i.e., a test signal) into one or more injection points along the analog signal path $S_A$ (e.g. the sensing feedback path) during normal runtime of the MEMS mirror 12. By way of example, triggered signal pulses can be injected into the driver circuitry (e.g., the drive capacitors) at the MEMS mirror 12, into signal lines of the PCB, or into one or more components (current clamps, TIAs, low-pass filters, etc.) arranged along the analog signal path $S_A$. When injecting a pulse into the driver circuitry of the MEMS mirror 12, the injection is limited to instances when the drive voltage HV is off and the drive capacitors are discharged.

An injected pulse eventually exits the analog delay block 42 by propagating through the at least a portion of the analog signal path $S_A$ and is received by the delay measurement circuit 45. As a result of a delay caused by one or more analog components, the injected pulse is delayed under a similar principle that cause the zero-crossing signal ZCmeas to be delayed. The delay measurement circuit 45 is configured to receive the delayed pulse and measure a delay period that is a time between transmitting the injected pulse and receiving the delayed pulse. This delay period represents a measured analog delay corresponding to the portion of the analog signal path $S_A$ through which the injected trigger pulse propagates.

The delay measurement circuit 45 is further configured to adapt or reprogram the programmable analog delay (i.e., the expected analog delay) of the programmable delay circuit 44. To accomplish this, the delay measurement circuit 45 may transmit a configuration signal Sc to the programmable delay circuit 44 that set the programmable analog delay based on the measured analog delay. As a result, the programmable analog delay can be updated periodically during runtime of the MEMS mirror 12 to account for dynamically changing analog delays. By doing so, the phase of the delayed zero-crossing reference signal is realigned with phase of the delayed zero-crossing signal (DZCmeas) on a periodic basis and precise MEMS position information can be provided to the system controller 23 and its laser shooting circuits.

In addition, the delay measurement circuit 45 is further configured to compare the measured analog delay with an expected delay range (e.g., with an expected delay threshold value). On a condition that the measured analog delay exceeds (e.g., is greater than) the expected delay threshold value, the delay measurement circuit 45 may be configured to generate a functional safety (FuSa) alarm indicating that a correct operation of the whole system cannot be guaranteed due to, for example, a component failure or aging. The FuSa alarm may be, for example, transmitted to an electronic control unit (ECU) of a vehicle that alerts a user that a repair of the LIDAR system is needed. Thus, the delay measurement circuit 45 may be used to monitor the overall functional safety of the LIDAR system as well as improve the compensation of analog delays in the circuitry of the MEMS mirror 12 and the MEMS driver 25.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application-specific integrated circuits (ASICs), field programmable logic arrays (FPGAs), programmable logic controller (PLC), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure. A control unit may use electrical signals and digital algorithms to perform its receptive, analytic, and control functions, which may further include corrective functions. Such hardware, software, and firmware may be implemented within the same device or within separate devices to support the various techniques described in this disclosure.

One or more aspects of the present disclosure may be implemented as a non-transitory computer-readable recording medium having recorded thereon a program embodying methods/algorithms for instructing the processor to perform the methods/algorithms. Thus, a non-transitory computer-readable recording medium may have electronically readable control signals stored thereon, which cooperate (or are capable of cooperating) with a programmable computer system such that the respective methods/algorithms are performed. The non-transitory computer-readable recording medium can be, for example, a CD-ROM, DVD, Blu-ray disc, a RAM, a ROM, a PROM, an EPROM, an EEPROM, a FLASH memory, or an electronic memory device.

Although various embodiments have been disclosed, it will be apparent to those skilled in the art that various changes and modifications can be made which will achieve some of the advantages of the concepts disclosed herein without departing from the spirit and scope of the invention. It will be obvious to those reasonably skilled in the art that other components performing the same functions may be suitably substituted. It is to be understood that other embodiments may be utilized and structural or logical changes may be made without departing from the scope of the present invention. It should be mentioned that features explained with reference to a specific figure may be combined with features of other figures, even in those not explicitly mentioned. Such modifications to the general inventive concept are intended to be covered by the appended claims and their legal equivalents.

What is claimed is:

1. An oscillator control system, comprising:
   an oscillator structure configured to oscillate about a rotation axis;
   a phase error detector configured to generate a phase error signal based on a delayed event time signal and delayed reference signal, wherein the delayed event time signal indicates measured event times of the oscillator structure oscillating about the rotation axis and the delayed reference signal indicates expected event times of the oscillator structure oscillating about the rotation axis;
   an analog signal path coupled between the oscillator structure and the phase error detector, the analog signal path configured to receive an event time signal indicating the measured event times and induces an analog delay on the event time signal thereby generating the delayed event time signal;
   a control circuit configured to generate a reference signal that indicates the expected event times, and generate a driving signal to drive an oscillation of the oscillator structure based on the phase error signal;
   a programmable delay circuit configured with a programmable delay, the programmable delay circuit configured to receive the reference signal and induce the programmable delay on the reference signal thereby generating the delayed reference signal; and
   an analog delay measurement circuit configured to inject a test signal into the analog signal path, receive a delayed test signal from the analog signal path, measure the analog delay based on the delayed test signal, and generate a configuration signal configured to adjust the programmable delay of the programmable delay circuit according to the measured analog delay.

2. The oscillator control system of claim 1, wherein:
   the measured event times are measured zero-crossing times at which a rotation angle of the oscillator structure is 0° as the oscillator structure oscillates about the rotation axis, and
   the expected event times are expected zero-crossing times at which the rotation angle of the oscillator structure is expected to be 0°.

3. The oscillator control system of claim 2, wherein the phase error detector is configured to determine timing differences between the measured zero-crossing times and the expected zero crossing times, where a timing difference is determined for each of the measured zero-crossing times and a respective one of the expected zero crossing times, and generate the phase error signal representative of the determined timing differences.

4. The oscillator control system of claim 1, wherein:
   the analog delay measurement circuit is configured to inject the test signal into the analog signal path while the oscillator structure oscillates about the rotation axis, and
   the programmable delay circuit is configured to adjust the programmable delay while the oscillator structure oscillates about the rotation axis.

5. The oscillator control system of claim 1, wherein:
   the analog delay measurement circuit configured to periodically inject the test signal into the analog signal path while the oscillator structure oscillates about the rotation axis, and
   the programmable delay circuit is configured to periodically adjust the programmable delay while the oscillator structure oscillates about the rotation axis.

6. The oscillator control system of claim 1, wherein the analog signal path includes analog circuitry coupled to the oscillator structure.

7. The oscillator control system of claim 1, wherein the programmable delay circuit is configured to receive the configuration signal, adjust the programmable delay, and generate the delayed reference signal based on the adjusted programmable delay and the reference signal.

8. The oscillator control system of claim 1, wherein:
   the analog delay measurement circuit is configured to compare the measured analog delay to a delay threshold value, and
   on a condition that the measured analog delay exceeds the delay threshold value, generate an alarm signal indicating a system failure.

9. A method for controlling an oscillator structure configured to oscillate about a rotation axis according to a driving signal, the method comprising:
  driving the oscillator structure to oscillate about a rotation axis according to a driving signal;
  generating, by a phase error detector, a phase error signal based on a delayed event time signal and delayed reference signal, wherein the delayed event time signal indicates measured event times of the oscillator structure oscillating about the rotation axis and the delayed reference signal indicates expected event times of the oscillator structure oscillating about the rotation axis;
  inducing, by an analog signal path, an analog delay on the event time signal thereby generating the delayed event time signal, wherein the analog signal path is coupled between the oscillator structure and the phase error detector;
  generating a reference signal that indicates the expected event times;
  generating the driving signal to drive an oscillation of the oscillator structure based on the phase error signal;
  inducing a programmable delay on the reference signal thereby generating the delayed reference signal;
  injecting a test signal into the analog signal path;
  inducing, by the analog signal path, the analog delay on the test signal thereby generating the delayed test signal;
  measuring the analog delay based on the injected test signal and the delayed test signal; and
  generating a configuration signal configured to adjust the programmable delay according to the measured analog delay.

10. The method of claim 9, wherein:
  the measured event times are measured zero-crossing times at which a rotation angle of the oscillator structure is 0° as the oscillator structure oscillates about the rotation axis, and
  the expected event times are expected zero-crossing times at which the rotation angle of the oscillator structure is expected to be 0°.

11. The method of claim 9, wherein:
  injecting the test signal into the analog signal path is performed while the oscillator structure oscillates about the rotation axis, and
  adjusting the programmable delay is performed while the oscillator structure oscillates about the rotation axis.

12. The method of claim 9, further comprising
  periodically injecting the test signal into the analog signal path while the oscillator structure oscillates about the rotation axis; and
  periodically adjusting the programmable delay while the oscillator structure oscillates about the rotation axis.

13. The method of claim 9, further comprising:
  generating the delayed reference signal based on the adjusted programmable delay and the reference signal.

14. The method of claim 9, further comprising:
  comparing the measured analog delay to a delay threshold value; and
  on a condition that the measured analog delay exceeds the delay threshold value, generating an alarm signal indicating a system failure.

15. A Light Detection and Ranging (LIDAR) control system, comprising:
  a microelectromechanical system (MEMS) mirror configured to oscillate about a rotation axis;
  a phase error detector configured to generate a phase error signal based on a delayed event time signal and delayed reference signal, wherein the delayed event time signal indicates measured event times of the MEMS mirror oscillating about the rotation axis and the delayed reference signal indicates expected event times of the MEMS mirror oscillating about the rotation axis;
  an analog signal path coupled between the MEMS mirror and the phase error detector, the analog signal path configured to receive an event time signal indicating the measured event times and induces an analog delay on the event time signal thereby generating the delayed event time signal;
  a control circuit configured to generate a reference signal that indicates the expected event times and generate a driving signal to drive an oscillation of the MEMS mirror based on the phase error signal;
  a programmable delay circuit configured with a programmable delay, the programmable delay circuit configured to receive the reference signal and induce the programmable delay on the reference signal thereby generating the delayed reference signal; and
  an analog delay measurement circuit configured to inject a test signal into the analog signal path, receive a delayed test signal from the analog signal path, measure the analog delay based on the delayed test signal, and generate a configuration signal configured to adjust the programmable delay of the programmable delay circuit according to the measured analog delay.

16. The LIDAR control system of claim 15, wherein:
  the measured event times are measured zero-crossing times at which a rotation angle of the MEMS mirror is 0° as the MEMS mirror oscillates about the rotation axis, and
  the expected event times are expected zero-crossing times at which the rotation angle of the MEMS mirror is expected to be 0°.

17. The LIDAR control system of claim 16, wherein the phase error detector is configured to determine timing differences between the measured zero-crossing times and the expected zero crossing times, where a timing difference is determined for each of the measured zero-crossing times and a respective one of the expected zero crossing times, and generate the phase error signal representative of the determined timing differences.

18. The LIDAR control system of claim 15, wherein:
  the analog delay measurement circuit is configured to inject the test signal into the analog signal path while the MEMS mirror oscillates about the rotation axis, and
  the programmable delay circuit is configured to adjust the programmable delay while the MEMS mirror oscillates about the rotation axis.

19. The LIDAR control system of claim 15, wherein:
  the analog delay measurement circuit configured to periodically inject the test signal into the analog signal path while the MEMS mirror oscillates about the rotation axis, and
  the programmable delay circuit is configured to periodically adjust the programmable delay while the MEMS mirror oscillates about the rotation axis.

20. The LIDAR control system of claim 15, wherein the analog signal path includes analog circuitry coupled to the MEMS mirror.

21. The LIDAR control system of claim 15, wherein the programmable delay circuit is configured to receive the configuration signal, adjust the programmable delay, and generate the delayed reference signal based on the adjusted programmable delay and the reference signal.

22. The LIDAR control system of claim 15, wherein:
the analog delay measurement circuit is configured to compare the measured analog delay to a delay threshold value, and
on a condition that the measured analog delay exceeds the delay threshold value, generate an alarm signal indicating a system failure.

\* \* \* \* \*